(12) United States Patent
Patade et al.

(10) Patent No.: US 8,950,173 B2
(45) Date of Patent: Feb. 10, 2015

(54) INTEGRATED EXHAUST GAS AFTER-TREATMENT SYSTEM FOR DIESEL FUEL ENGINES

(75) Inventors: Vishnu Kedari Patade, Nashik (IN); Rakesh Janardhan Kokate, Nashik (IN); Madhav Anant Hardikar, Nashik (IN); Ramasamy Velusamy, Nashik (IN)

(73) Assignee: Mahindra & Mahindra Limited (IN)

( * ) Notice: Subject to any disclaimer, the term of this patent is extended or adjusted under 35 U.S.C. 154(b) by 0 days.

(21) Appl. No.: 13/879,318

(22) PCT Filed: Dec. 15, 2011

(86) PCT No.: PCT/IN2011/000859
§ 371 (c)(1),
(2), (4) Date: Jul. 8, 2013

(87) PCT Pub. No.: WO2012/085931
PCT Pub. Date: Jun. 28, 2012

(65) Prior Publication Data
US 2013/0283770 A1 Oct. 31, 2013

(30) Foreign Application Priority Data
Dec. 22, 2010 (IN) .................. 3490/MUM/2010

(51) Int. Cl.
*F01N 3/00* (2006.01)
*F01N 3/021* (2006.01)
*F01N 3/10* (2006.01)
*F01N 3/20* (2006.01)
*F01N 13/02* (2010.01)

(52) U.S. Cl.
CPC ................ *F01N 3/021* (2013.01); *F01N 3/103* (2013.01); *F01N 3/2066* (2013.01); *F01N 13/02* (2013.01); *F01N 2560/06* (2013.01); *Y02T 10/24* (2013.01)

USPC .................. 60/286; 60/297; 60/299; 60/301; 60/303

(58) Field of Classification Search
USPC ............ 60/286, 295, 297, 299, 301, 303, 311
See application file for complete search history.

(56) References Cited

U.S. PATENT DOCUMENTS 7,062,904 B1 * 6/2006 Hu et al. ......................... 60/286
7,673,448 B2 * 3/2010 Voss et al. ...................... 60/297

(Continued)

FOREIGN PATENT DOCUMENTS

| CN | 101713319 A | 5/2010 |
| WO | 2009140245 A2 | 11/2009 |
| WO | 2010050857 A1 | 5/2010 |

*Primary Examiner* — Binh Q Tran
(74) *Attorney, Agent, or Firm* — Mayback & Hoffman, P.A.; Gregory L. Mayback

(57) ABSTRACT

An integrated exhaust gas after-treatment system for eliminating pollutants present in exhaust gases is disclosed. The integrated exhaust gas after-treatment system includes a Diesel Oxidation Catalyst (DOC)-Diesel Particulate Filter (DPF) assembly, a Selective Catalytic Reduction (SCR), a dosing module and a reducing agent supply system. The Diesel Oxidation Catalyst (DOC)-Diesel Particulate Filter (DPF) assembly is connected to an exhaust gas manifold of an engine and includes a canister for holding a Diesel Oxidation Catalyst (DOC) and a Diesel Particulate Filter (DPF). The Diesel Particulate Filter (DPF) is disposed downstream of the Diesel Oxidation Catalyst (DOC) and is spaced there-from. The Selective Catalytic Reduction (SCR) is disposed downstream of the Diesel Oxidation Catalyst (DOC)-Diesel Particulate Filter (DPF) assembly and facilitates elimination of NOx present in the exhaust gases by reduction of the NOx.

18 Claims, 8 Drawing Sheets

(56) References Cited

U.S. PATENT DOCUMENTS

| | | | |
|---|---|---|---|
| 8,062,617 B2* | 11/2011 | Stakhev et al. | 423/213.2 |
| 8,425,851 B2* | 4/2013 | Kimura | 422/177 |
| 2004/0206069 A1 | 10/2004 | Tumati et al. | |
| 2008/0083215 A1 | 4/2008 | Yan | |
| 2010/0242448 A1 | 9/2010 | Mital | |
| 2011/0047991 A1* | 3/2011 | Kato | 60/297 |

* cited by examiner

INTEGRATED EXHAUST GAS AFTER-TREATMENT SYSTEM FOR DIESEL FUEL ENGINES

CROSS-REFERENCE TO RELATED APPLICATIONS

This application claims the priority, under 35 U.S.C. §§119, 120, 363, and 371, of India patent application No. 3490/MUM/2010, filed Dec. 22, 2010, and International Application No. PCT/1N2011/000859, filed Dec. 15, 2011, which designated the United States and was published in English; the prior applications are herewith incorporated by reference in their entirety.

STATEMENT REGARDING FEDERALLY SPONSORED RESEARCH OR DEVELOPMENT

Not Applicable.

FIELD OF THE INVENTION

Background

Generally, exhaust gases emitted from an exhaust manifold of an engine are led to a catalytic converter mounted in an exhaust gas passage disposed down-stream of the exhaust manifold. The exhaust gases contain hydrocarbons, carbon monoxide and oxides of nitrogen, some portions of which are oxidized in the vicinity of noble earth metals. The exhaust gases further includes particulate matter in the form of soot that is required to be eliminated by a particulate filter. A muffler is also provided in the exhaust passage, downstream of the exhaust manifold of the engine. The muffler is adapted to attenuate noise and thereby reduce noise pollution.

Environmental regulations pertaining to reduction of harmful emission from engines are in force in many countries. The oxides of the nitrogen frequently referred as NOx are of grave concern as far as environment protection is concerned. NOx emission from certain engines can be treated using a selective catalyst reduction (SCR) catalyst. The SCR system uses reducing agents such as urea to yield NOx conversion performance. The NOx conversion performance converts the NOx into $N_2$. Some exhaust gas after-treatment systems deliver the exhaust gases emitted by the exhaust manifold of the engine to a SCR system.

Various exhaust after-treatment systems in the prior art are directed at eliminating one or more of the different pollutants, i.e. CO, NO, hydrocarbons, NOx emissions, particulate matter present in the exhaust gases. For example, some disclosures suggest use of an oxidation catalyst for eliminating CO, NO and hydrocarbons from the exhaust gases, others recommend use of SCR for elimination NOx emissions, while still others suggest use of DPF or other filters for elimination particulate matter from exhaust gases. More specifically, depending on the nature of the pollutant to be eliminated, different exhaust after-treatment systems are used. However, none of the exhaust after treatment systems known in the prior art are directed towards eliminating different pollutants, i.e. CO, NO, hydrocarbons, NOx emissions, particulate matter present in the exhaust gases emitted from a diesel fuel engine collectively, irrespective of the nature of the pollutant.

Accordingly, there is a need for an exhaust after treatment system that eliminates different pollutants, i.e. CO, NO, hydrocarbons, NOx emissions, and particulate matter present in the exhaust gases emitted from a diesel fuel engine, irrespective of the nature of the pollutant. Still further, there is a need for an integrated layout of an exhaust gas after-treatment system used for purification of exhaust gases emitted from an exhaust manifold of a diesel engine that enhances effectiveness of the various elements of the exhaust gas after-treatment system by strategically placing the various elements of the exhaust after treatment system with respect to each other.

SUMMARY OF THE INVENTION

An object of the present invention is to integrate various elements of an exhaust gas treatment system to reduce undesirable components from an exhaust gas emitted from an engine of a vehicle, thereby enabling the vehicle to meet stringent emission norms.

Another object of the present invention is to integrate an oxidation catalyst system and a particulate filter system with a selective catalytic converter system so as to simultaneously achieve reduction of hydrocarbon components, carbon monoxide components, NOx components along with particulate matter from the exhaust gas in a cascading synergistic manner.

Another object of the invention is to provide users with a hassle free option of a diesel engine which can meet stringent emission norms.

Another object of the present invention is to integrate the various elements of the exhaust gas after-treatment system on a compact vehicle such as a small truck, a small utility vehicle (SUV) or a car with a monocoque construction or body over chassis design, thereby facilitating easy access to the various components of the exhaust gas after-treatment system, such as a reducing agent filing system.

Still another object of the present invention is to provide an exhaust gas after system fitted with a particulate filter that may be periodically regenerated without even requiring intervention of the user, wherein a DELTA PRESURE sensor, a NOX sensor works in conjunction with an engine control unit (ECU) for controlling engine parameters that in turn facilitate in achieving regeneration of the particulate filter and thereby improve the optimum performance of the engine.

These and other objects of the present invention are dealt in great extent by the accompanying drawings and the descriptive matter in which there are illustrated exemplary embodiments of the invention.

An integrated exhaust gas after-treatment system for eliminating pollutants present in exhaust gases emitted from an engine as the exhaust gases pass there-through is disclosed in accordance with an embodiment of the present invention. The integrated exhaust gas after-treatment system includes a Diesel Oxidation Catalyst (DOC)-Diesel Particulate Filter (DPF) assembly, a Selective Catalytic Reduction (SCR), a dosing module and a reducing agent supply system. The Diesel Oxidation Catalyst (DOC)-Diesel Particulate Filter (DPF) assembly is connected to an exhaust gas manifold of an engine and includes a canister for holding a Diesel Oxidation Catalyst (DOC) and a Diesel Particulate Filter (DPF). The canister receives exhaust gases from the exhaust gas manifold of the engine and is provided with a plurality of mountings configured thereon for facilitating mounting of different sensors. The Diesel Oxidation Catalyst (DOC) is disposed inside the canister near an operative top end thereof. The Diesel Oxidation Catalyst includes a plurality of flow passages configured along the length thereof for facilitating laminar flow of the exhaust gases there-through. The Diesel Oxidation Catalyst oxidizes NO, CO and hydro-carbons present in the exhaust gases, thereby raising the temperature of the exhaust gases. The Diesel Particulate Filter (DPF) is disposed inside the canister near an operative bottom end thereof for trapping particulate matter present in the exhaust gases. The Diesel Particulate Filter (DPF) is disposed downstream of the Diesel Oxidation Catalyst (DOC) and is spaced there-from. The Diesel Particulate Filter (DPF) includes a plurality of side walls configuring a plurality of flow passages, wherein inlets and outlets of the flow passages are alternatively closed for facilitating diffusion of the exhaust gases through the side walls configuring the flow passages. The side walls configuring the flow passages of the Diesel Particulate Filter (DPF) are coated with particulate adsorbent for absorbing particulate matter present in the exhaust gases passing there-through. The Selective Catalytic Reduction (SCR) is connected to the Diesel Oxidation Catalyst (DOC)-Diesel Particulate Filter (DPF) assembly via a connecting passage and is disposed down-stream thereof. The Selective Catalytic Reduction (SCR) facilitates elimination of NOx present in the exhaust gases by reduction of the NOx. The dosing module is disposed down-stream of the Diesel Oxidation Catalyst (DOC)-Diesel Particulate Filter (DPF) assembly and upstream of the Selective Catalytic Reduction (SCR). The dosing module injects a reducing agent into the connecting passage upstream of the Selective Catalytic Reduction (SCR), wherein the reducing agent reacts inside the Selective Catalytic Reduction (SCR) with the NOx present in the exhaust gases for facilitating reduction of said NOx. The reducing agent supply system includes a reducing agent supply tank and a reducing agent supply line. The reducing agent supply tank holds reducing agent therein. The reducing agent supply line connects the reducing agent supply tank to the dosing module.

Typically, the Diesel Oxidation Catalyst (DOC) is configured of a cordierite substrate coated with Platinum/Palladium (Pt/Pd) coating.

Similarly, the Diesel Particulate Filter (DPF) is configured of a Al/Ti alloy substrate coated with Platinum/Palladium (Pt/Pd) coating.

Preferably, the elements of the integrated exhaust gas after-treatment system are supported on a drive away chassis of a vehicle.

Generally, the integrated exhaust gas after-treatment system further includes a first NOx sensor received in a mounting configured on the operative top end of the canister holding the Diesel Oxidation Catalyst (DOC) and the Diesel Particulate Filter (DPF) for determining level of NOx present in the exhaust gases entering the integrated exhaust gas after-treatment system.

Specifically, the integrated exhaust gas after-treatment system further includes a second NOx sensor disposed downstream of the Selective Catalytic Reduction (SCR) for determining level of NOx present in the exhaust gases leaving the Selective Catalytic Reduction (SCR).

Further, the integrated exhaust gas after-treatment system includes a first temperature sensor received in a mounting configured on the operative top end of the canister holding the Diesel Oxidation Catalyst (DOC) and the Diesel Particulate Filter (DPF) for determining temperature of the exhaust gases entering the integrated exhaust gas after-treatment system.

Still further, the integrated exhaust gas after-treatment system includes a second temperature sensor received in a mounting configured on a portion of the canister between the Diesel Oxidation Catalyst (DOC) and the Diesel Particulate Filter (DPF).

Furthermore, the integrated exhaust gas after-treatment system includes a third temperature sensor disposed downstream of the Diesel Oxidation Catalyst (DOC)-Diesel Particulate Filter (DPF) assembly for determining temperature of the exhaust gases leaving the Diesel Oxidation Catalyst (DOC)-Diesel Particulate Filter (DPF) assembly.

Typically, the integrated exhaust gas after-treatment system includes a lambda sensor received in a mounting configured on the operative top end of said canister holding the Diesel Oxidation Catalyst (DOC) and the Diesel Particulate Filter (DPF).

Particularly, the Diesel Particulate Filter (DPF) gets regenerated by the high temperature exhaust gases leaving the Diesel Oxidation Catalyst (DOC).

Further, the integrated exhaust gas after-treatment system includes a pair of pressure sensors, wherein a first pressure sensor of the pair of pressure sensors is disposed upstream of the Diesel Particulate Filter (DPF) and a second pressure sensor of the pair of pressure sensors is disposed downstream of the Diesel Particulate Filter (DPF) for determining pressure drop across the Diesel Particulate Filter (DPF), thereby facilitating in determining level of blockage of the Diesel Particulate Filter (DPF) by particulate matter trapped therein.

Typically, the connecting passage connecting the Diesel Oxidation Catalyst (DOC)-Diesel Particulate Filter (DPF) assembly to the Selective Catalytic Reduction (SCR) is a flexible coupling.

Generally, the dosing module is electronically controlled.

Further, the integrated exhaust gas after-treatment system includes a mixer assembly disposed downstream of the dosing module and upstream of the Selective Catalytic Reduction (SCR) for facilitating homogeneous mixing of the reducing agent injected by the dosing module with the exhaust gases leaving the Diesel Oxidation Catalyst (DOC)-Diesel Particulate Filter (DPF) assembly.

Typically, the space between the Diesel Oxidation Catalyst (DOC) and the Diesel Particulate Filter (DPF) held inside the canister is in the range of 3 mm to 15 mm.

Preferably, the reducing agent is ammonia.

Alternatively, the reducing agent is urea.

BRIEF DESCRIPTION OF THE DRAWINGS

The objects and features of the present invention will be more clearly understood from the following description of the invention taken in conjunction with the accompanying drawings which are mainly illustrative, in which.

DETAILED DESCRIPTION OF THE INVENTION

Figure 1:
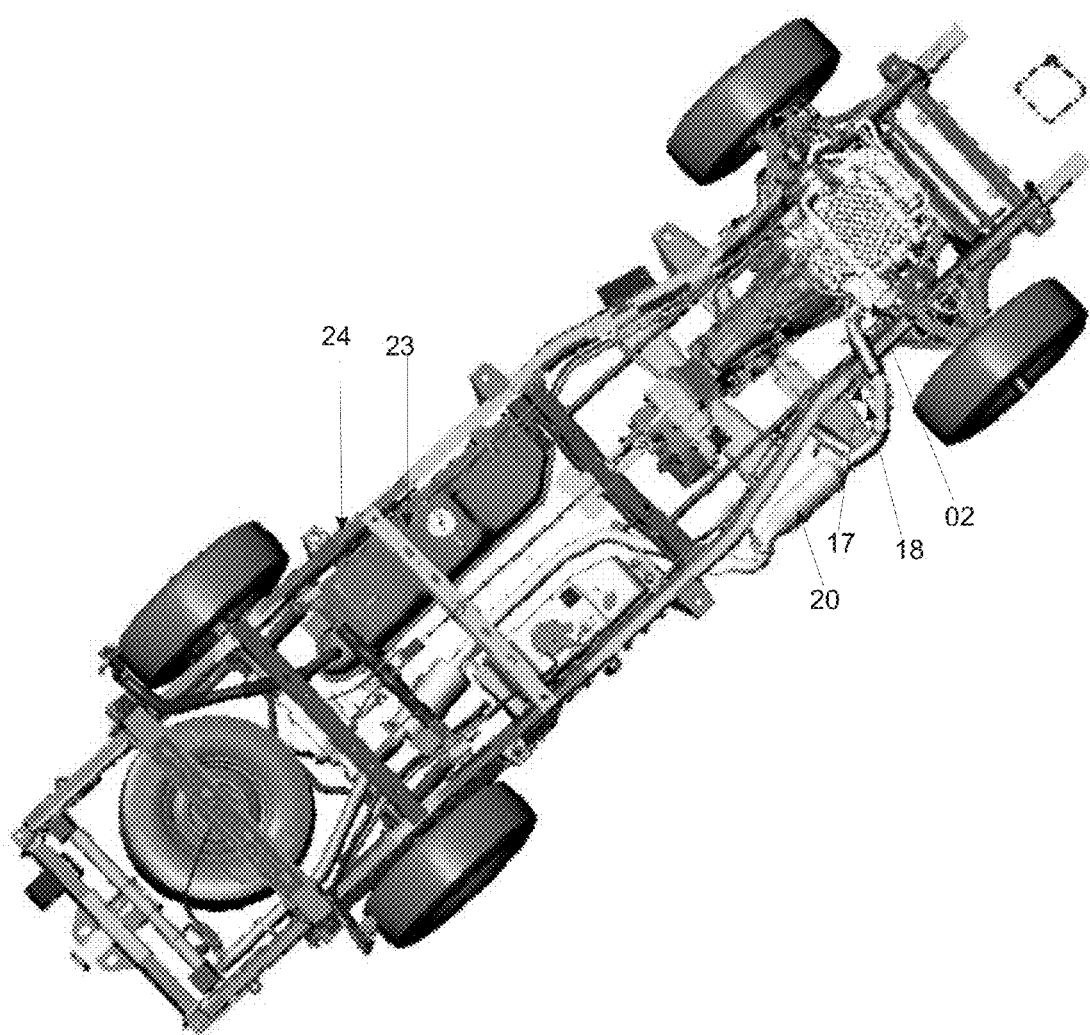
FIG. 1 illustrates a perspective view of all the elements of an integrated exhaust after-treatment system arranged on a drive away chassis of a vehicle, in accordance with the system-layout of the present invention.

The present invention discloses an integrated layout of an exhaust gas after treatment system used for purification of exhaust gases emitted from an exhaust manifold of a diesel engine. However, with certain adaptations the integrated layout of an exhaust gas after treatment system may also be applicable to gasoline or Compressed Natural Gas (CNG) and Liquid Petroleum Gas (LPG) engines.

In accordance with the system-layout of the present invention, a turbocharged diesel engine is connected to an exhaust after treatment passage. The turbocharger of the engine is connected with the exhaust after treatment passage by means of a flange. The exhaust after treatment passage includes a replaceable Diesel Oxidation Catalyst (DOC) and a Diesel Particulate Filter (DPF) assembly as separate modules. An upstream cone of the DOC-DPF assembly is designed to achieve optimum possible uniformity index for the velocity of the gas at the entrance of the DOC-DPF assembly. Generally the uniformity index targeted at the entrance of DOC-DPF assembly is required to be in the range of 0.7-0.95. The uniformity index is calculated using CFD techniques. The upstream cone of the DOC-DPF assembly also house sensors for measurement of oxygen, NOx and the temperature of the exhaust gas entering the DOC-DPF assembly.

The DOC-DPF assembly in accordance with the system-layout of the present invention is additionally supported on an engine block of the vehicle, more specifically, the portion of the DOC-DPF assembly that is downstream of the cone of the DOC-DPF assembly is supported on the engine block of the vehicle. The outlet passage of the DOC-DPF assembly is also adapted to house sensors, which give feedback to the engine control unit (ECU), which in turn controls various fuel injection parameters.

A Selective Catalytic Reduction (SCR) module is placed in the exhaust passage sequentially downstream of the DOC-DPF assembly. A portion of the exhaust after-treatment passage connects an outlet passage of the DOC-DPF assembly to an inlet cone of the SCR module. The portion of the exhaust after-treatment passage connecting the DOC-DPF assembly to the SCR module is adapted to house a reducing agent injector that injects a reducing agent like urea into the exhaust gas stream treated by the DOC-DPF assembly. Further, a mixer is provided on line between the DOC DPF assembly and the SCR module, and more particularly between the reducing agent injector and the SCR module to ensure mixing of reducing agent and the treated exhaust gas emanating from the DOC-DPF assembly.

The exhaust gas emanating from the diesel engines contains hydro-carbons (HC), Carbon-monoxide (CO), Carbon-dioxide ($CO_2$), oxides of nitrogen (NO), nitrogen-dioxide ($NO_2$), $H_2O$ and the like. The exhaust gas after-treatment system in accordance with the system-layout of the present invention includes DOC, DPF and SCR in sequence for achieving purification of exhaust gases passing therethrough. In the first phase of the purification, the exhaust gases enter the DOC, in the DOC oxidation reaction takes place and a portion of the CO contained in the exhaust gases is converted to $CO_2$, NO is converted to $NO_2$ and HC are converted to $CO_2$ and $H_2O$. The oxidation reaction taking place in the DOC is an exothermal reaction and is thereby used to raise the temperature of the exhaust gas. The heated exhaust gases leaving the DOC are specifically used for regenerating the DPF that follows the DOC and accordingly the DOC and the DPF are configured inside a single can structure with the space between the DOC and the DPF being between 3 mm to 15 mm.

The exhaust gas leaving the DOC and containing partially converted CO is led to the diesel particulate filter DPF in which any residual CO is converted to $CO_2$ and the particulate matter in the exhaust gas is trapped in the DPF. The DPF, which is basically a particulate matter trap, needs regeneration once it is critically blocked. The regeneration of the DPF starts at higher exhaust gas temperatures, e.g., 650 deg C. A higher exhaust gas temperature can be achieved by introducing partially burnt fuel containing HC and CO as major constituents to the DOC, wherein oxidation of such gases raises the temperature to a required limit. Further, in accordance with another embodiment of the present invention, the engine operating conditions may be controlled so as to achieve a critical pre-determined temperature of the exhaust gases entering the DPF to facilitate activate regeneration thereof. The various types of sensors mounted on the exhaust passage give signals to an Engine Control Unit (ECU) to control engine operating parameters for achieving pre-desired exhaust content. According to still another embodiment of the present invention, an external fuel burner is used to raise the temperature of the exhaust gases to a predetermined limit before the DPF to activate regeneration. The burner is controlled by an external control unit, such as the Engine control unit or a dedicated control unit which can communicate with the engine control unit for engine operating conditions, and can change operating conditions in such a burner by controlling air and/or fuel supply. The regeneration of the DPF is based on the predetermined values of temperature measured by temperature sensor mounted upstream of DOC DPF assembly and the pressure difference measured by the system comprising the pressure differential sensor connected to DOC DPF assembly.

The exhaust gas leaving the DOC and the DPF flows to the SCR. While the exhaust gas is traveling through a flow path connecting the DPF to the SCR, the exhaust gas takes up urea from a dosing module, particularly a urea dosing module. In the SCR the $NO_x$ present in the exhaust gases reacts with the ammonia from the urea to result in $N_2$ and $H_2O$. The urea may be heated by a heating element disposed inside the urea storing tank in order to enhance performance.

The exhaust gas after-treatment system in accordance with the system-layout of the present invention is adapted to eliminate most of NOx, CO and HC. More specifically, most of the NOx, CO and HC are converted to harmless $N_2$ and $H_2O$.

Oxidation of the available NO in the exhaust stream to $NO_2$ in a desired ratio, (In the order of preferably 1:1) helps in attaining optimum NOx conversion at the SCR module. Oxidation of the NO to $NO_2$ can be achieved at the DOC level or at the DPF level. To achieve a desired oxidation of the NO to $NO_2$ a precious metal coating can be provided either in the DOC and/or in the DPF. Generally precious metals like Pt:Pd are used for this purpose.

In sequence with DOC-DPF assembly is the SCR module, more particularly, the SCR module is placed in the exhaust stream and downstream of the DOC-DPF assembly. In accordance with a feature of this invention, the SCR module does not use Pt or Pd for catalytic conversion of the NOx. In the exhaust stream passage between DPF and the SCR a reducing agent is introduced and mixed so that the mixture so formed is uniform to an acceptable limit for NOx conversion. If mixture formation is not acceptable and is limited by the space for exhaust passage, a mixer may be optionally fitted along the passage to achieve optimum mixing of the reducing agent fed via a remotely located injector and the treated exhaust gas emanating from the particulate filter of the DPF.

Reducing agents like an aqueous solution of urea can be used for reducing the NOx content. Optimum temperature for conversion of NOx depends on the technology of coating selected for conversion of NOx, and is well known to persons skilled in art. Suitable SCR catalysts available in the art include Cu based, vanadium based or iron based catalysts. In accordance with a preferred embodiment of this invention Fe based catalysts are used for reducing NOx.

In an optional embodiment of this invention an oxidation catalyst is provided downstream of the SCR to oxidize any NH3 slipping through the SCR.

Figure 6:
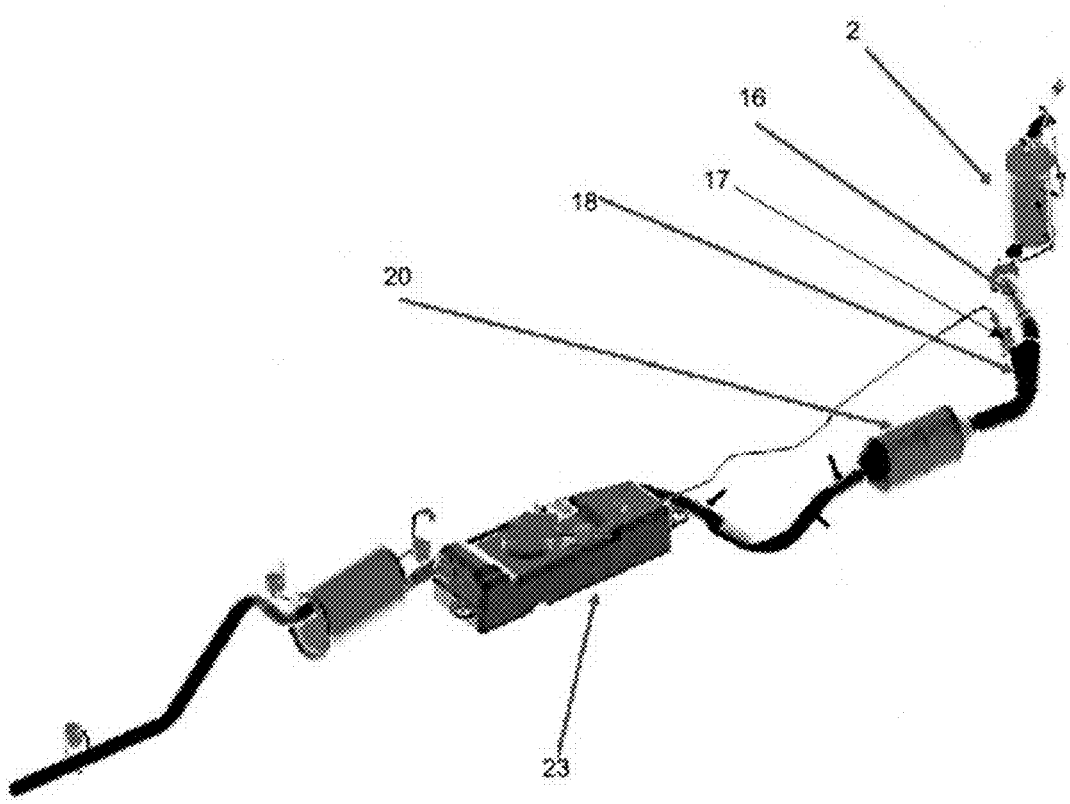
FIG. 6 illustrates schematic representation showing all the components of the integrated exhaust after-treatment system arranged in accordance with the present invention.
Figure 7:
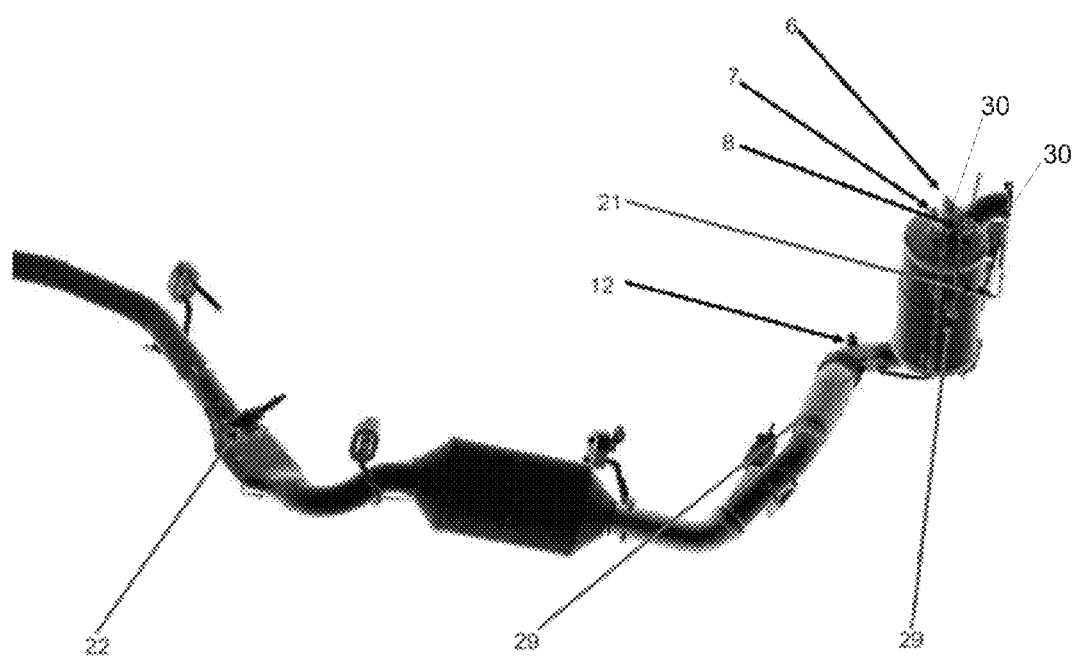
FIG. 7 illustrates another schematic representation showing of NOx sensors, temperature sensors and differential pressure sensors disposed along the integrated exhaust after-treatment system in accordance with the present invention.

The exhaust after-treatment system, with various elements thereof arranged in accordance with the system-layout of the present invention facilitates diesel powered vehicles in meeting emission norms of US Tier II Bin 5 or emission norms that are equivalent to Euro 5. Referring to FIG. 1 of the accompanying drawings, all the elements of the exhaust after-treatment system are arranged on a drive away chassis 24 of the diesel powered vehicle, in accordance with the system-layout of the present invention. The system-layout of the present invention is adapted to integrate an oxidation element, a particulate filter and a NOx elimination element together in a single system so as to eliminate most of the undesirable components present in the exhaust gases. The exhaust gas after-treatment system includes a DOC-DPF assembly 02, a urea dosing module 17, a SCR module 20, a urea supply system including a urea supply tank 23 and a urea supply line 25 connecting the urea supply tank 23 to the urea dosing module 17. The DOC-DPF assembly 02 includes a DOC 02a and a DPF 02b both housed inside a single can and spaced apart from each other. The DOC 02a is separated from the DPF 02b in the range of 3 mm to 15 mm. The exhaust after-treatment system in accordance with the system-layout of the present invention utilizes utilises the NOx elimination element that is arranged in accordance with an arrangement illustrated FIG. 6 and FIG. 7 of the present invention.

Figure 2:
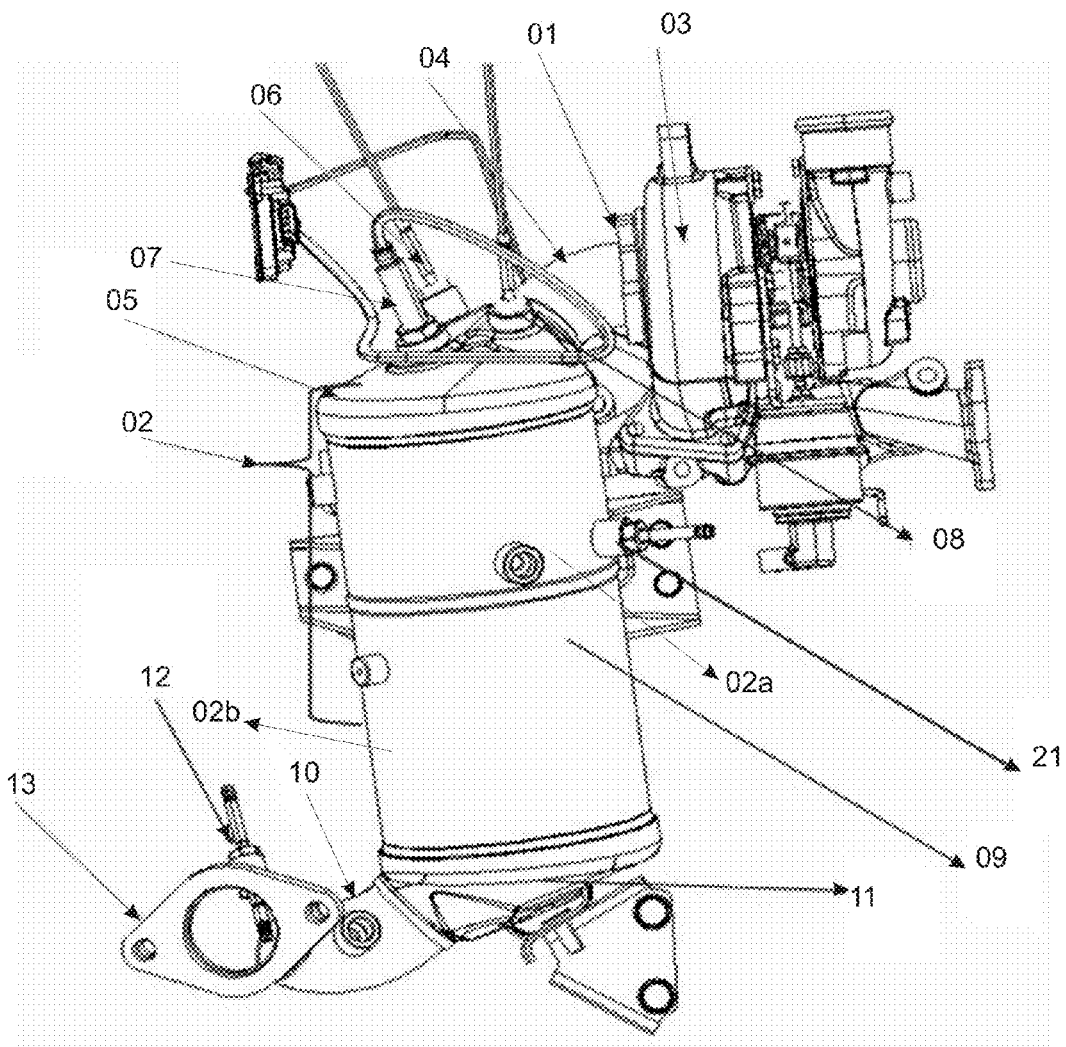
FIG. 2 illustrates a DOC-DPF assembly comprising a DOC and a DPF assembled together in a single can and sensors mounted on the can in accordance with the present invention.

Referring to FIG. 2 of the accompanying drawings, the DOC-DPF assembly 02 of the exhaust after-treatment system is illustrated. As illustrated in FIG. 2 an exhaust flange 01 is used to mount a DOC-DPF assembly 02 on a turbo charger 03. A pipe 04 connects the flange 01 with an inlet cone 05 of the DOC-DPF assembly 02. The DOC-DPF assembly includes a canister that holds a Diesel Oxidation Catalyst (DOC) disposed near an operative top end thereof and a Diesel Particulate Filter (DPF) disposed near an operative bottom end thereof. The inlet cone 05 of the DOC-DPF assembly 02 houses a mounting for mounting a NOx sensor 06, which monitors the levels of the NOx entering the exhaust after-treatment system immediately after the turbo charger 03. The inlet cone 05 of the DOC-DPF assembly 02 also houses a mounting for mounting a Lamda sensor 07, and another mounting for mounting a temperature sensor 08. The Lambda sensor 07 is mounted adjacent to a NOx sensor 06, and on a mounting boss welded on to the inlet cone 05 of the DOC-DPF assembly 02. The first temperature sensor 08 is also mounted on the inlet cone 05 of the DOC-DPF assembly 02. The inlet cone 05 of the DOC-DPF assembly 02 is welded to an outer shell/can 09 which houses the DOC and the DPF. Inside the DOC 02a oxidation reaction takes place and a portion of the CO contained in the exhaust gases is converted to $CO_2$, NO is converted to $NO_2$ and HC are converted to $CO_2$ and $H_2O$. The oxidation reaction taking place in the DOC 02a is an exothermal reaction and is thereby used to raise the temperature of the exhaust gas. The Diesel Oxidation Catalyst 02a includes a plurality of flow passages configured along the length thereof for facilitating laminar flow of the exhaust gases there-through. The flow passages are configured from a substrate made of cordierite (oxidation catalyst) and coated with Platinum/Palladium (Pt/Pd) coating. The Pt/Pd coating has a typical composition in which ratio of Pt to Pd is in ratio 2:1 and is having a density of 100 g/ft$^3$. In-stead of using Pt/Pd coating with ratio of Pt to Pd in ratio 2:1, the Pt/Pd ratio can vary and can have ratios 1:1, 2:1, 3:1, 4:1 and 6:1. Further, the coating may use Pt and Pd as the only constituents. The DPF is disposed downstream of the DOC. The DPF also includes a plurality of straight flow passages, wherein DPF flow passages are open at one end and closed at other end with particulate adsorbent disposed between the adjacent passages. More specifically, the Diesel Particulate Filter (DPF) includes a plurality of side walls configuring a plurality of flow passages, wherein inlets and outlets of the flow passages are alternatively closed for facilitating diffusion of the exhaust gases through the side walls configuring the flow passages. The exhaust gases flowing through the DPF passages communicate with each other by diffusing through the walls of the adjacent passages and passing through the particulate adsorbent disposed between the adjacent passages. The DPF passages are configured from Al/Ti alloy substrate coated with Pt/Pd.

The heated exhaust gases leaving the DOC 02a are specifically used for regenerating the DPF 02b that follows the DOC 02a. A second temperature sensor 21 is mounted on the outer shell 09, more specifically a pocket is formed just above a division between the DOC 02a and the DPF 02b. The pocket is protruding inside the DOC and is adapted to hold the temperature sensor 21 that is adapted to read temperature of the exhaust gases leaving the DOC and just before entering the DPF.

The DOC-DPF assembly 02 further includes a pipe 10 disposed down-stream of the DOC-DPF assembly 02, wherein the pipe 10 is adapted to connect the outlet cone 11 of the DOC-DPF assembly 02 to an intermediate flange 13. Further, a third temperature sensor 12 is fitted downstream of the DPF 02b for measuring the temperature of the exhaust gases leaving the DOC-DPF assembly 2. The temperature sensor 12 located on the outlet passage of the DOC DPF housing is located at a predetermined length from the DPF outlet for optimum performance. This predetermined length is in relation with the diameter of the outlet of the DOC DPF housing.

Figure 3:
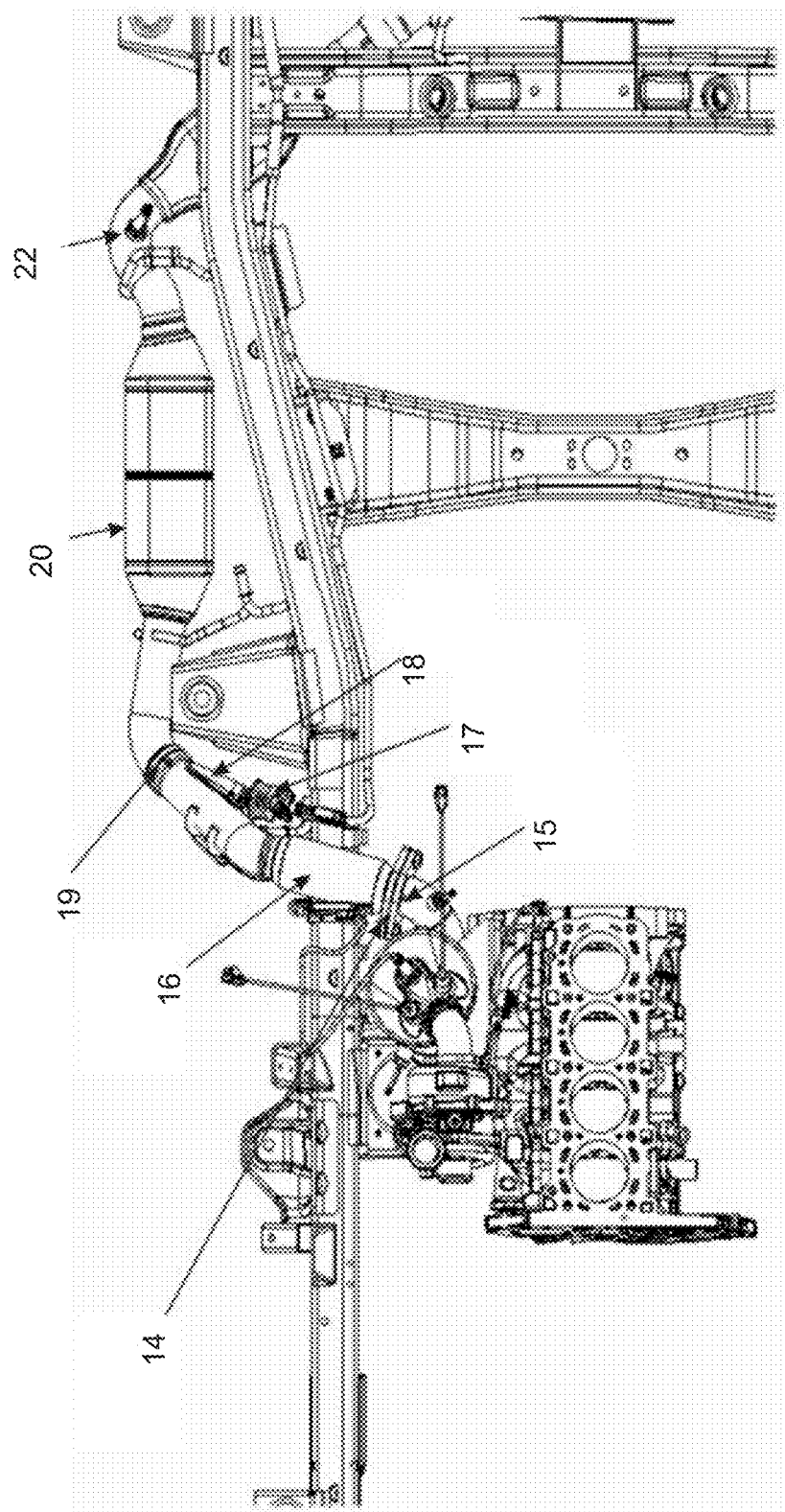
FIG. 3 illustrates a SCR assembly and a dosing module arranged in accordance with the system-layout in accordance with the present invention.

Referring to FIG. 2 and FIG. 3, the intermediate flange 13 (illustrated in FIG. 2) and the intermediate flange 14 (illustrated in FIG. 3) along with the gasket 15 (illustrated in FIG. 3) form a gas tight joint for the integrated system. Referring to FIG. 3 of the accompanying drawings, the system further includes a flexible coupling 16 disposed immediately after the intermediate flange 14, the flexible coupling 16 is adapted to isolate the DOC-DPF assembly 02 and the SCR module 20 from the engine vibrations. An electronically controlled dosing module 17 is also fitted to a cone 18, wherein the electronically controlled dosing module 17 injects liquid urea solution into the exhaust stream just after the exhaust gases leave the DPF 02b of the DOC-DPF 02 assembly.

Further, referring to FIG. 3 of the accompanying drawing, a second NOx sensor 22 is mounted on the exhaust gas passage after the SCR assembly 20, the second NOx sensor 22 is adapted to measure the $NO_X$ levels in the exhaust gases leaving the SCR. By comparing the levels of the $NO_X$ levels as measured by the first $NO_X$ sensor 06 and the second $NO_X$ sensor 22, the reduction in $NO_X$ levels due to exhaust gases passing through the SCR assembly 20 can be determined and accordingly the overall effectiveness of the SCR assembly 20 can also be determined. The SCR assembly 20 is so mounted on the chassis through elastomeric mounts such that the SCR assembly 20 is away from the vehicle centerline and outside the chassis frame.

Figure 4:
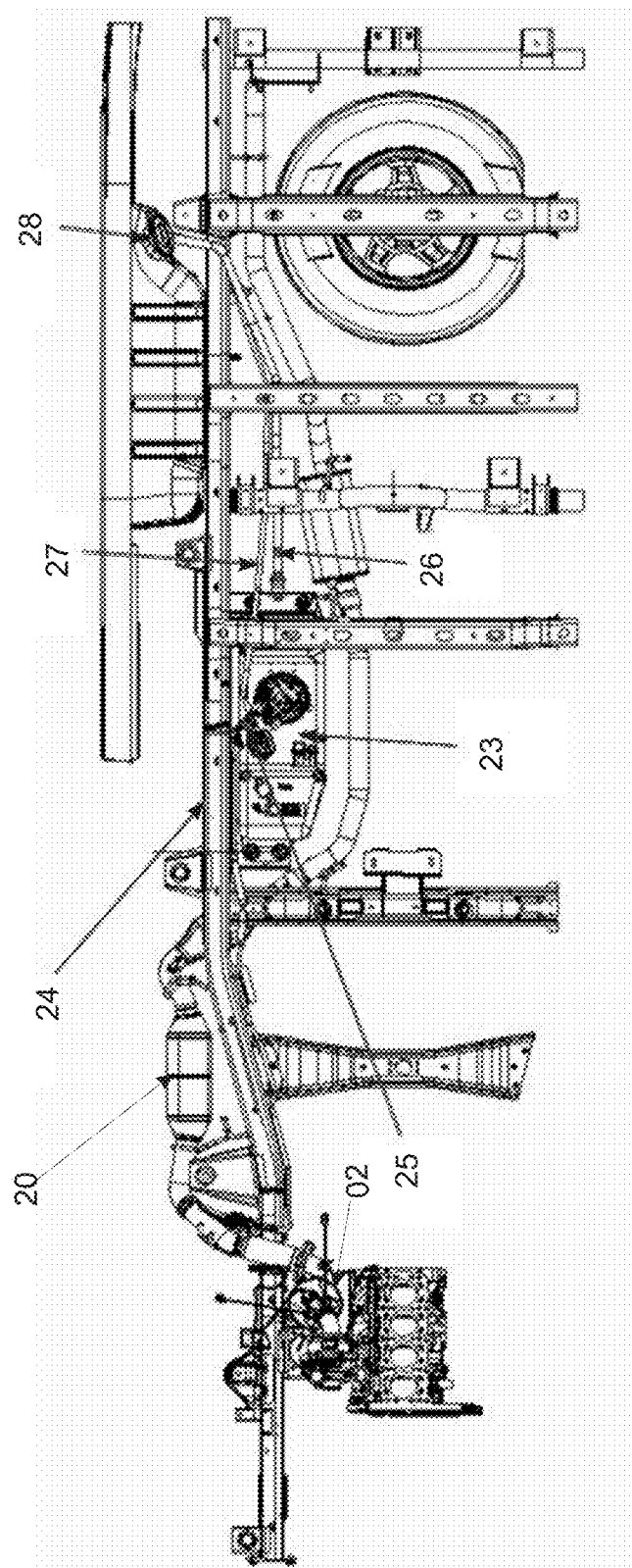
FIG. 4 illustrates a reducing agent supply system, vent lines and filler neck disposed along the system-layout in accordance with the present invention.
Figure 5:
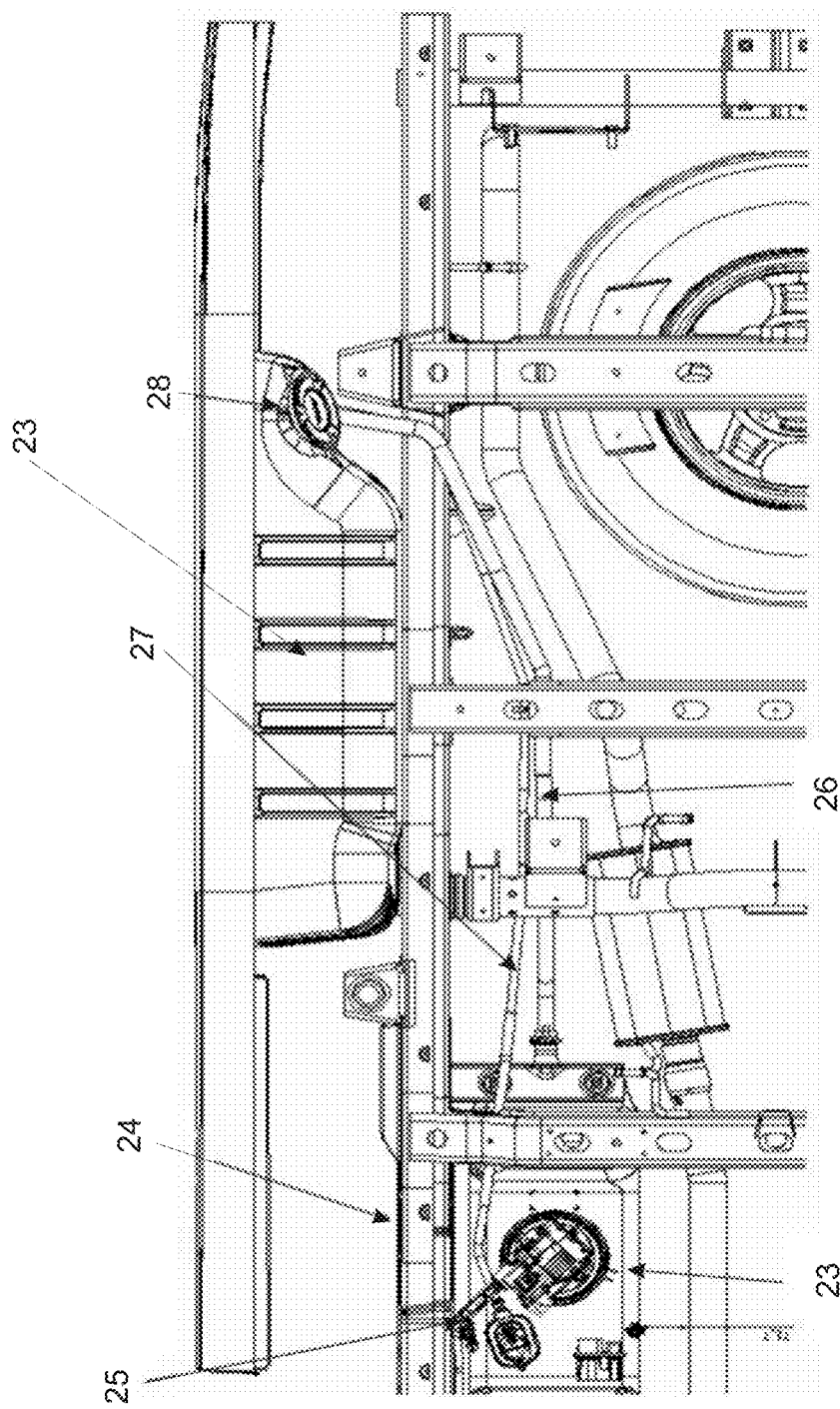
FIG. 5 illustrates a magnified view of the reducing agent supply system, the vent lines and the filler neck of FIG. 4.

In accordance with one embodiment of the present invention, a storage tank 23 containing reducing agent, particularly urea solution is mounted on the chassis frame 24 of the vehicle. The urea supply tank 23 supplies liquid urea solution to the urea dosing module 17, via supply lines 25. Referring to FIG. 4 of the accompanying drawings, the urea supply tank 23, the filling line 26, the venting line 27 and the filler neck 28 are illustrated. The filling line 26 and the venting line 27 are connected to a filler neck 28 which facilitates the filling and refilling of the liquid urea solution into the urea storage tank 23, from where the liquid urea is supplied to a location before the SCR 20 of the exhaust after-treatment system. The urea supply tank 23 can be refilled. The urea supply tank 23 is in fluid communication with a filler neck mounted on the wheel house area of the cargo. The filler neck for facilitating filling of the urea supply tank 23 has an opening so placed on a vehicle body so as to be able to be accessed by a user from outside of the vehicle body.

In accordance with one embodiment of the invention the filling neck for the reducing agent dosing module has an opening so placed on a vehicle body so as to be able to be accessed by a user from outside of the vehicle body.

Figure 8:
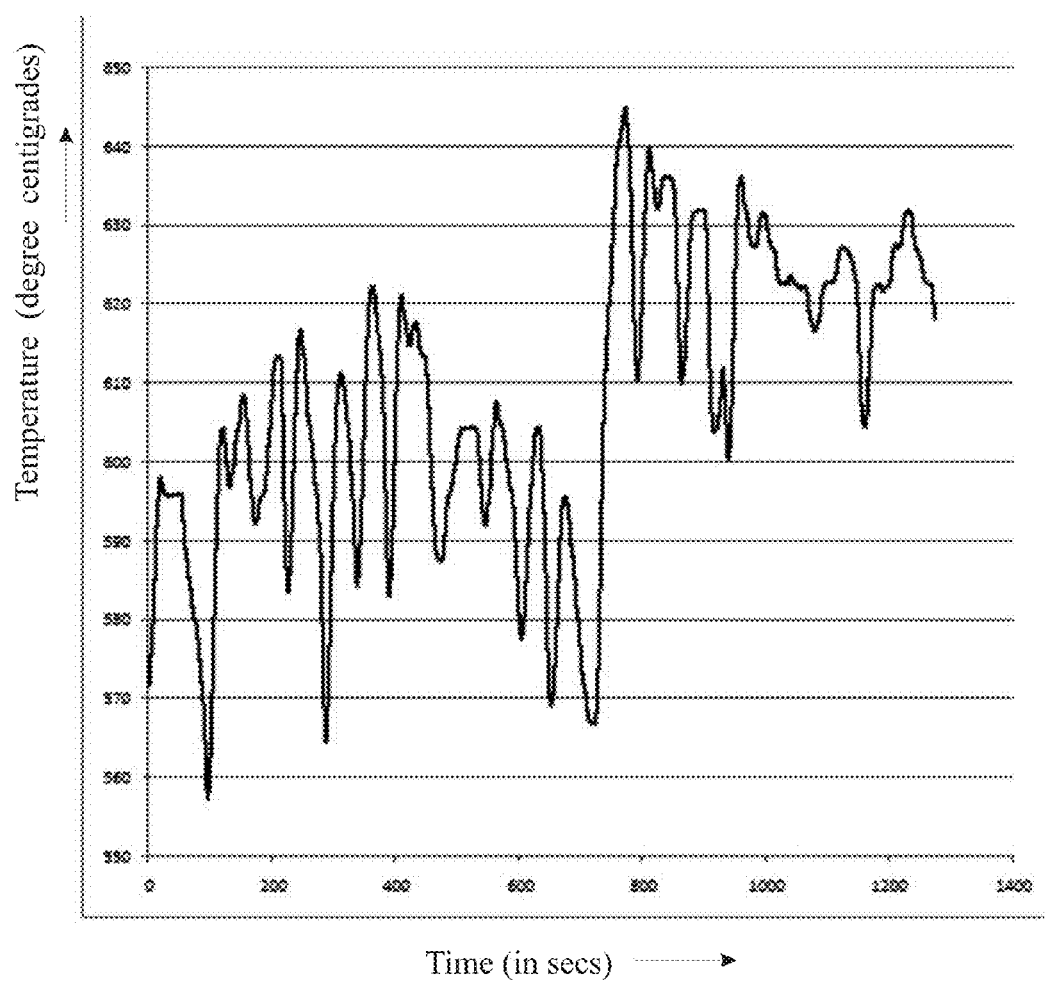
FIG. 8 illustrates a graph depicting the variation of exhaust gas temperature entering the DPF as a function of time.

The DPF 02b disposed just after the DOC 02a is adapted to trap particulate matter contained exhaust gases treated by the DOC 02a. With time, the DPF 02b gets plugged with particulate matter and is required to be regenerated. Once the DPF is loaded with the particulate matter, the pressure drop between the inlet and exit to the DPF exceeds threshold value and prompts starting of regeneration cycle for the DPF. During the regeneration cycle, the fuel supply to the engine is regulated so as to increase exhaust gases temperatures, the high temperature exhaust gases burn away the deposited particulate matter to continuously regenerate the DPF. In accordance with one embodiment of the present invention, partially burnt fuel containing HC and CO as major constituents are supplied to the DOC 02a, causing oxidation of such gases and raising the temperature of the exhaust gas to a required limit for facilitating the regeneration of the DPF 02b disposed downstream of the DOC-DPF assembly 02. The temperature of the exhaust gases leaving the DOC 02a of the DOC-DPF assembly 02 is critical and has to be monitored regularly. The temperature of exhaust gases leaving the DOC 02a of the DOC-DPF assembly 02 is determined by the temperature sensor 21. The temperature of the exhaust gases leaving the DOC 02a and entering the DPF 02b vary in the range of 550° C. to 650° C. Tests were conducted to determine the temperature of the exhaust gases leaving the DOC 02a and entering the DPF 02b at different time. FIG. 8 of the accompanying drawings illustrates the variation of the temperature with respect to time.

From the tests and the graphs depicting the test data it is evident that the temperature of exhaust gases entering the DPF 02b varies in the range of 550° C. to 650° C. More specifically, under ideal operational conditions, the temperature of the exhaust gases entering a fully loaded DPF at the start of the regeneration cycle, at the middle of the regeneration cycle and at the end of the regeneration cycle is about 570° C., 600° C. and 620° C. respectively. Further, the minimum temperature of the exhaust gases entering DPF 02b that is required for starting the regeneration of the DPF 02b is in the range of 550° C. to 560° C. Further, duration of regeneration and temperature of exhaust gases entering DPF are controlled due to the fact that, material of DPF can withstand temperature of 800° C. to 1100° C. depending on its properties. Increase in temperature inside DPF is due to exothermic reaction with collected soot mass. However, the passive regeneration of the DPF, which is not controlled, will always take place in the temperature range of 250° C. to 400° C. The high temperature gas burns away the particulate matter trapped inside the DPF 02b. In order to determine, whether the DPF 02b is blocked or not, a pressure drop is measured across the DPF 02b. In order to measure the pressure drop across the DPF 02b, a pressure differential sensor 29 comprising a first differential pressure port and a second differential pressure port disposed at extreme ends of the DPF 02b and a pair pressure tubes 30 are utilized. Tests were conducted to find pressure drop across the DPF 02b that are indicative of the fully loaded condition of the DPF 02b. Based on the tests conducted on a vehicle running at specified test conditions of 50 Km/hr, 1800 rpm and 100 N-m inner torque condition, with exhaust gases flowing through the DPF at a flow rate of 180 $m^3$/hr under filter temperature of 260° C., the pressure drop of 50 mBar indicated fully loaded condition of the DPF 02b.

The complete system is integrated to meet the requirements of reducing pollutants in the exhaust emission such as CO, particulate matter, and mainly NOx.

Thus as can be envisaged in accordance with aforesaid description, the invention discloses an integrated exhaust gas treatment system comprising, at least one of a diesel oxidation catalyst (DOC) 02a, a Diesel particulate filter (DPF) 02b or precious metal coated DPF (cDPF) mounted on an engine, an SCR 20, a reducing agent injector 17 and a optionally a mixer 19, temperature sensors 08, 21 and 12, a lambda sensor 07, a pair of NOx sensors 06 mounted on an entry cone of a DOC-DPF assembly 02 and another NOx sensor 22 mounted downstream of the SCR, wherein the DOC 02a of the DOC-DPF assembly 02 is in proximity to the turbocharger outlet at a predetermined length preferably in a ratio of 1:1 to 1:5 for diameter to length of the passage connecting the turbocharger 03 to the DOC 02a, at least one temperature sensor, lambda sensor and NOx sensor being positioned at a predetermined length from the turbocharger outlet or engine exhaust outlet and so aligned to each other at a predetermined angle with respect to each other and inclined at an angle to the axial flow of the exhaust gases there-through for optimization of engine performance at different engine operating conditions.

In accordance with an optional embodiment of the invention, an oxidation catalyst module is mounted in the exhaust gas passage after the SCR to reduce $NH_3$ slip by means of oxidation, wherein the oxidation catalyst module disposed after the SCR module is loaded with a precious metal to accelerate the oxidation process.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. An integrated exhaust gas after-treatment system for eliminating pollutants present in exhaust gases emitted from an engine as said exhaust gases pass there-through, said integrated exhaust gas after-treatment system comprising:

a Diesel Oxidation Catalyst-Diesel Particulate Filter assembly adapted to connect to an exhaust gas manifold of an engine, said Diesel Oxidation Catalyst-Diesel Particulate Filter assembly comprising:

a canister adapted to receive exhaust gases from said exhaust gas manifold of the engine and provided with a plurality of mountings configured thereon to mount different sensors, the canister having an operative top end, a length, and an operative bottom end;

a Diesel Oxidation Catalyst disposed inside said canister and adjacent said operative top end, said Diesel Oxidation Catalyst defining a plurality of flow passages configured along the length thereof to facilitate laminar flow of the exhaust gases there-through, said Diesel Oxidation Catalyst adapted to oxidize NO, CO and hydro-carbons present in the exhaust gases, thereby raising the temperature of the exhaust gases;

a Diesel Particulate Filter disposed inside said canister and adjacent said operative bottom end thereof to trap particulate matter present in the exhaust gases, said Diesel Particulate Filter disposed downstream of said Diesel Oxidation Catalyst and spaced there-from in a range of 3 mm to 15 mm, said Diesel Particulate Filter comprising a plurality of side walls defining a plurality of flow passages, wherein inlets and outlets of the flow passages are alternatively closed to facilitate diffusion of the exhaust gases through said side walls defining the flow passages, said side walls being coated with particulate adsorbent adapted to absorb particulate matter present in the exhaust gases passing there-through;

a connecting passage;

a Selective Catalytic Reduction connected to said Diesel Oxidation Catalyst-Diesel Particulate Filter assembly through said connecting passage and disposed down-stream thereof, said Selective Catalytic Reduction adapted to facilitate elimination of NOx present in the exhaust gases by reduction of the NOx;

a dosing module disposed down-stream of said Diesel Oxidation Catalyst-Diesel Particulate Filter assembly and upstream of said Selective Catalytic Reduction and adapted to inject a reducing agent selected from at least one of ammonia and urea into said connecting passage upstream of said Selective Catalytic Reduction, wherein said reducing agent reacts inside said Selective Catalytic Reduction with the NOx present in the exhaust gases for facilitating reduction of said NOx; and a reducing agent supply system comprising:

a reducing agent supply tank adapted to hold reducing agent therein; and a reducing agent supply line connecting said reducing agent supply tank to said dosing module.

2. The integrated exhaust gas after-treatment system of claim 1, wherein said Diesel Oxidation Catalyst comprises a cordierite substrate coated with Platinum/Palladium (Pt/Pd) coating.

3. The integrated exhaust gas after-treatment system of claim 1, wherein said Diesel Particulate Filter comprises a Al/Ti alloy substrate coated with Platinum/Palladium (Pt/Pd) coating.

4. The integrated exhaust gas after-treatment system of claim 1, wherein at least one of said Diesel Oxidation Catalyst-Diesel Particulate Filter assembly, said Selective Catalytic Reduction, said dosing module, and said reducing agent supply system is adapted to be supported on a drive away chassis of a vehicle.

5. The integrated exhaust gas after-treatment system of claim 1, wherein said operative top end of said canister has a mounting and which further comprises a first NOx sensor received in said mounting and adapted to determine a level of NOx present in the exhaust gases entering the integrated exhaust gas after-treatment system.

6. The integrated exhaust gas after-treatment system of claim 1, further comprising a second NOx sensor disposed down-stream of said Selective Catalytic Reduction and adapted to determine a level of NOx present in the exhaust gases leaving said Selective Catalytic Reduction.

7. The integrated exhaust gas after-treatment system of claim 1, wherein said operative top end of said canister has a mounting and which further comprises a first temperature sensor received in said mounting and adapted to determine temperature of the exhaust gases entering the integrated exhaust gas after-treatment system.

8. The integrated exhaust gas after-treatment system of claim 1, wherein said canister has a portion of between said Diesel Oxidation Catalyst and said Diesel Particulate Filter and at which is disposed a canister mounting, and which further comprises a second temperature sensor received in said canister mounting.

9. The integrated exhaust gas after-treatment system of claim 1, further comprising a third temperature sensor disposed downstream of said Diesel Oxidation Catalyst-Diesel Particulate Filter assembly and adapted to determine temperature of the exhaust gases leaving said Diesel Oxidation Catalyst-Diesel Particulate Filter assembly.

10. The integrated exhaust gas after-treatment system of claim 1, wherein said operative top end of said canister has a mounting and which further comprises a lambda sensor received in said mounting.

11. The integrated exhaust gas after-treatment system of claim 1, wherein said Diesel Particulate Filter is adapted to be regenerated by the exhaust gases leaving said Diesel Oxidation Catalyst.

12. The integrated exhaust gas after-treatment system of claim 1, further comprising a pair of pressure sensors, wherein a first pressure sensor of said pair of pressure sensors is disposed upstream of said Diesel Particulate Filter and a second pressure sensor of said pair of pressure sensors is disposed downstream of said Diesel Particulate Filter, said pair of pressure sensors adapted to determine a pressure drop across said Diesel Particulate Filter, thereby facilitating a determination of a level of blockage of said Diesel Particulate Filter by particulate matter trapped therein.

13. The integrated exhaust gas after-treatment system of claim 1, wherein said connecting passage connecting said Diesel Oxidation Catalyst-Diesel Particulate Filter assembly to said Selective Catalytic Reduction is a flexible coupling.

14. The integrated exhaust gas after-treatment system of claim 1, wherein said dosing module is electronically controlled.

15. The integrated exhaust gas after-treatment system of claim 1, further comprising a mixer assembly disposed downstream of said dosing module and upstream of said Selective Catalytic Reduction and adapted to homogeneously mix said reducing agent injected by said dosing module with the exhaust gases leaving said Diesel Oxidation Catalyst-Diesel Particulate Filter assembly.

16. The integrated exhaust gas after-treatment system of claim 5, further comprising a second NOx sensor disposed down-stream of said Selective Catalytic Reduction and adapted to determine a level of NOx present in the exhaust gases leaving said Selective Catalytic Reduction.

17. The integrated exhaust gas after-treatment system of claim 7, wherein said canister has a portion of between said Diesel Oxidation Catalyst and said Diesel Particulate Filter and at which is disposed a canister mounting, and which further comprises a second temperature sensor received in said canister mounting.

18. The integrated exhaust gas after-treatment system of claim 17, which further comprises a third temperature sensor disposed downstream of said Diesel Oxidation Catalyst-Diesel Particulate Filter assembly and adapted to determine temperature of the exhaust gases leaving said Diesel Oxidation Catalyst-Diesel Particulate Filter assembly.

* * * * *